(No Model.)
O. H. P. BROWN.
LEVELING AND PLUMBING INSTRUMENT.
No. 297,227. Patented Apr. 22, 1884.
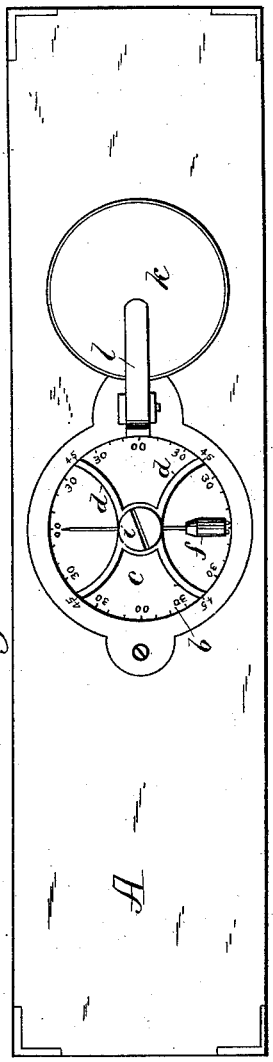
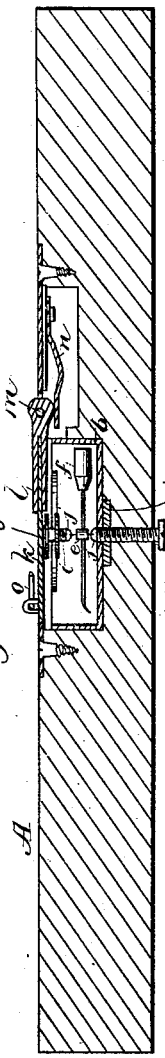
Witnesses
Wm. A. Rosenbaum
J. J. Duffie
Inventor:
O. H. P. Brown
by J. S. Duffie
Atty.

United States Patent Office.

OLIVER H. P. BROWN, OF CLARKSVILLE, ARKANSAS.

LEVELING AND PLUMBING INSTRUMENT.

SPECIFICATION forming part of Letters Patent No. 297,227, dated April 22, 1884.

Application filed March 1, 1884. (No model.)

*To all whom it may concern:*

Be it known that I, OLIVER H. P. BROWN, a citizen of the United States, residing at Clarksville, in the county of Johnson and State of Arkansas, have invented certain new and useful Improvements in Leveling and Plumbing Instruments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to combined plumbs and levels; and it consists in the novel construction and arrangement of its parts, hereinafter particularly set out and described.

In the accompanying drawings, Figure 1 is a face view of my invention with the lid thrown open, exposing the face to view. Fig. 2 is a longitudinal sectional view of the same.

A is the body of my combined plumb and level.

$b$ is the cup embedded in the body A.

$c$ is the face. This face $c$ is divided into four equal parts of ninety degrees each, so that no matter which side of the level is turned up the finger will point out the degree of variation on the upper disk of the face, and no matter which end of the plumb is turned up the finger will point out the degree of variation on the upper disk of the face.

$d$ is a frame having four arms, and is secured to the top edge of the cup $b$, and is for the purpose of holding a bearing for the upper end of the pivot $e$ in the weighted plumb $f$.

$f$ is a weighted plumb having its finger end bent down, so that it will be on a parallel line with the lower side of the weighted end of the plumb.

$g$ is a threaded set-screw working in the threaded plate $h$. In the upper end of this set-screw is a socket for the pivot $e$.

$i$ is a threaded set-screw working in a female screw in frame $d$.

The pivot $e$ is of the finest steel, and works in jewels $j$ $j$, set in the ends of set-screws $g$ and $i$, so that the plumb will quickly indicate the slightest variation from a plumb or level position.

In order to preserve the delicate points and keep the instrument from becoming dull, I have arranged the set-screws $g$ and $i$ so that when the instrument is not being used, or is being carried about, I can turn set-screw $g$ back until the plumb $f$ rests its finger end and weighted end down on the face $c$, which is on the bottom of the cup $b$. Then I turn set-screw $i$ down until the plumb is made tight, and it is thus held from turning and wearing off the points of pivot $e$. These set-screws $g$ and $i$ are also for the purpose of delicately adjusting the plumb $f$, so that its finger will quickly yield to the slightest variation and point out the same on the face $c$.

For making a cheaper class of my invention, I shall dispense with the jewels in the set-screws, making the screws out of hard material.

My invention is provided with a lid, $k$, hinged to the body of A. This cover $k$ is provided with a small ring, $o$, that it may be thrown open easily.

What I claim as new, and desire to secure by Letters Patent, is—

1. In a combined plumb and level, the combination of set-screw $g$, working in threaded plate $h$, secured on the back of cup $b$, and bearing in its jewel $j$ the lower end of pivot $e$, with set-screw $i$, working in a female screw in frame $d$, and bearing in its jewel $j$ the upper end of pivot $e$, both adapted to work together, all substantially as shown, and for the purposes set forth.

2. In a combined plumb and level, the combination of set-screw $g$, working in threaded plate $h$, secured on the back of cup $b$, and bearing in its upper end the lower end of pivot $e$, with set-screw $i$, working in a female screw in frame $d$, and bearing in its lower end the upper end of pivot $e$, and face $c$, set in the bottom of cup $b$, weighted plumb $f$, and its finger, all substantially as shown and described, and for the purposes set forth.

In testimony whereof I affix my signature in presence of two witnesses.

OLIVER H. P. BROWN.

Witnesses:
 JNO. G. CONNELLEY,
 J. W. COFFMAN.